Patented Apr. 19, 1938

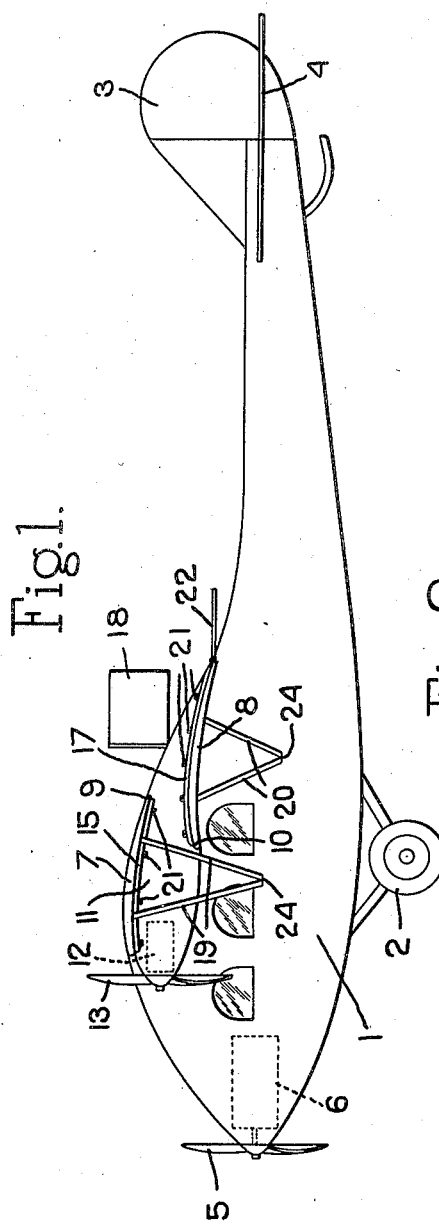
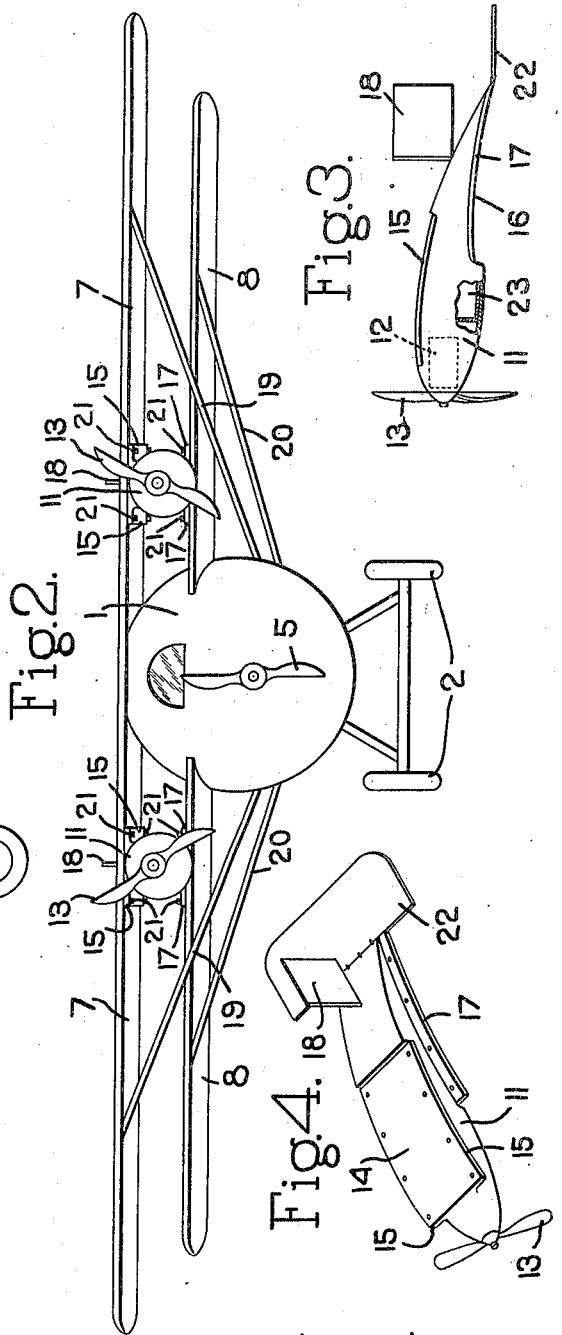

2,114,606

UNITED STATES PATENT OFFICE 2,114,606

AIRPLANE

John J. O'Neill, Lowell, Mass.

Application July 20, 1937, Serial No. 154,534

3 Claims. (Cl. 244—54)

This invention relates to airplanes and it has for one of its objects to provide a novel airplane which can be readily converted from a single-motor craft to a tri-motor craft.

Further objects of the invention are to improve airplanes in various particulars which will be more fully hereinafter set forth.

Referring to the drawing wherein I have illustrated a selected embodiment of the invention, Fig. 1 is a side view of the airplane having my improvements applied thereto;

Fig. 2 is a front view thereof;

Fig. 3 is a side view of one of the auxiliary motor supports which are used for converting the single-motor airplane into a tri-motor airplane;

Fig. 4 is a perspective view of the motor support;

In the drawing 1 indicates the body of the airplane which may have any suitable or usual shape or construction, 2 is the landing gear, 3 is the rudder and 4 is the elevator.

The airplane has at the front of the body a main propeller 5 which is operated from a suitable motor indicated diagrammatically at 6.

The airplane is equipped with two sets of wings, an upper pair of wings 7 and a lower pair of wings 8. The wings 7 are substantially flush with the upper surface of the body 1 and extend laterally therefrom as indicated in Fig. 2. The second or lower set of wings 8 extend laterally from the body 1 near the upper portion thereof but are situated somewhat below and to the rear of the wings 7 as best seen in Figs. 1 and 2. The upper and lower wings are so disposed relative to each other that the rear or trailing edge 9 of the wings 7 overlie somewhat the leading edge 10 of the wings 8. By placing both wings at the upper portion of the body and by having the wings 8 in the rear of the wings 7 but with the front edge of the wings 8 underlying the rear edge of the wings 7 an increased lifting power is given to the airplane.

I have also provided a construction which permits the airplane to be readily converted from a single-motor airplane into a tri-motor craft or vice versa.

For this purpose I provide two auxiliary motor supports indicated at 11, each carrying a motor 12 and a propeller 13 operated thereby, which auxiliary motor supports can be introduced between the wings on each side of the body portion 1 and secured to the wings. These auxiliary motor supports 11 are preferably streamline in outline so as to reduce wind resistance, and for removably securing them to the wings 7 and 8 each motor support is formed on its upper side with a bearing surface 14 adapted to rest against the under side of the wing 7 and with flanges 15 by which the auxiliary support can be bolted to the upper wing 5. Each auxiliary motor support 11 is also provided on its under side with a bearing surface 16 adapted to rest on and to fit the shape of the upper surface of the lower wing 8, said auxiliary motor support further being provided with flanges 17 at each side by which the auxiliary support can be bolted to the lower wing.

This auxiliary motor support is preferably provided with a removable rudder 18. The shape of the auxiliary motor support 11 is such that when the auxiliary rudder is removed said auxiliary support can be introduced between the wings 8 from the front, and when it is properly positioned then the flanges 15 and 17 may be bolted to the upper and lower wings respectively by bolts 21, thereby rigidly securing the motor support in place.

It will be understood, of course, that the engines 12 of the auxiliary supports will be provided with suitable gas feed pipes leading to the gasoline supply.

After the auxiliary motor supports 11 have been bolted in place then the rudders 18 therefor may be assembled with the motor supports. These rudders may have suitable controlling connections (not shown) leading to the pilot's cockpit so that if for any reason the main rudder 3 becomes damaged or does not function properly the auxiliary rudders 18 may be used for steering the ship. These auxiliary motor supports will also preferably be provided with elevators 22 which can be controlled by the operator of the ship in any suitable or usual way. The rear or tail end of the auxiliary supports 11 are made hollow thereby providing chambers 23 which may serve as storage for gasoline.

The wings 7 and 8 may be braced in any approved way. I have herein shown for this purpose two braces for each wing, the braces for the wing 7 being indicated at 19 and those for the wing 8 being indicated at 20.

There are two braces for each wing and the two braces have an angular relation to each other, and the two braces for each wing are connected to the body of the airplane at the same point as indicated at 24.

While I have shown and illustrated an embodiment of the invention I do not wish to be limited to the constructional features shown.

I claim:

1. An airplane comprising a body, an upper pair of wings extending laterally from the top of the body, a second pair of wings also extending laterally from the upper portion of the body but situated below and to the rear of the first pair of wings, the rear edge of the upper wings overlapping somewhat the front edge of the lower wings, a main motor-driven propeller at the front end of the body portion, an auxiliary motor support situated between and secured to the upper and lower wings on each side of the airplane, each motor support having an elongated enclosed body which extends rearwardly beyond the trailing edge of the upper wing and forwardly beyond the leading edge of the lower wing, the top of the rear portion of each motor support body being flush with and forming a continuation of the top face of the upper wing, and the bottom of said auxiliary motor support being flush with and forming a continuation of the under face of the lower wing, and an auxiliary motor-driven propeller carried by each motor support.

2. An airplane comprising a body, an upper pair of wings extending laterally from the top of the body, a second pair of wings also extending laterally from the upper portion of the body but situated below and to the rear of the first pair of wings, the rear edge of the upper wings overlapping somewhat the front edge of the lower wings, a main motor-driven propeller at the front end of the body portion, an auxiliary motor support situated between and removably secured to the upper and lower wings on each side of the airplane, each motor support having an elongated enclosed body which extends rearwardly beyond the trailing edge of the upper wing and forwardly beyond the leading edge of the lower wing, and an auxiliary motor-driven propeller carried by each motor support.

3. An airplane comprising a body, an upper pair of wings extending laterally from the top of the body, a second pair of wings also extending laterally from the upper portion of the body but situated below and to the rear of the first pair of wings, the rear edge of the upper wings overlapping somewhat the front edge of the lower wings, a main motor-driven propeller at the front end of the body, an auxiliary motor support situated between the upper and lower wings on each side of the airplane, each motor support having an elongated body which extends rearwardly beyond the trailing edge of the upper wing and forwardly beyond the leading edge of the lower wing, the forward portion of each motor support having on its upper side a face fitting against the under side of the upper wing and the rear portion of each motor support having on its bottom a second face fitting the shape of and resting directly on the upper face of the lower wing, means for detachably securing each auxiliary motor support to both wings, and a motor-driven propeller carried by each support.

JOHN J. O'NEILL.